Nov. 11, 1969   W. D. BRADSHAW   3,477,361

DEEP FAT FRYER FILTERING SYSTEM

Filed Aug. 9, 1968

Wright D. Bradshaw
INVENTOR.

BY *[signatures]*
Attorneys

United States Patent Office 3,477,361
Patented Nov. 11, 1969

3,477,361
DEEP FAT FRYER FILTERING SYSTEM
Wright D. Bradshaw, 7160 Augusta Blvd.,
Seminole, Fla. 33540
Filed Aug. 9, 1968, Ser. No. 751,464
Int. Cl. A47j 37/12
U.S. Cl. 99—408                                    5 Claims

ABSTRACT OF THE DISCLOSURE

A filter and strainer assembly incorporated into the bottom portion of a deep fat fryer combined with an external motor driven pump for pumping liquefied fat from the bottom of the fryer through the filter and strainer assembly and then back into the deep fat fryer.

---

In restaurants, hospitals and other similar institutions which prepare food for relatively large numbers of persons, a substantial quantity of food is prepared by frying in a quantity of cooking oil retained in a vat. This type of cooking is usually referred to as deep fat frying. The commodities cooked in this manner frequently are coated with a coating of bread-like material, crumbs or the like which frequently drop off during the cooking operation and accumulate on the bottom of the deep fat fryer. This material accumulates to a relatively thick coating on the bottom of the deep fat fryer thus causing an unsanitary condition as well as a condition which somewhat inhibits the cooking operation and serves to absorb odors from one material cooked in the deep fat and transfer it to another food article cooked in the deep fat.

Accordingly, it is an object of the present invention to provide a filtering and straining assembly incorporated into the bottom of a deep fat fryer and communicated with a pump to circulate the cooking oil or fat through the filter and strainer and discharge the cleaned cooking oil or fat back into the deep fat fryer which not only serves to collect the particles of food within the strainer but also serves to agitate the cooking oil by circulation thus reducing the cooking time for an article of food such as a piece of cold chicken which has been dropped into the cooking oil which will conventionally form a cold spot therein with the circulation produced by the pump serving to eliminate such a cold spot.

Additionally, the present invention incorporates a filter and strainer assembly which may be incorporated into conventional existing deep fat fryers and generally is in the form of a well connected with the bottom of the deep fat fryer in depending relation thereto and communicated with the interior thereof together with a basket-like strainer with a correspondingly shaped filter disposed therein. The basket-like strainer with the filter therein and, of course, the material removed from the deep fat may be easily removed for cleaning or replacement of the filter by lifting it up through the deep fat in the fryer.

Still another feature of the present invention is to provide a cleaning system for the cooking oil or fat in a deep fat fryer which will remove the major source of contamination of the deep fat thus retaining the deep fat in a clean, sanitary and odor-free condition with the assembly of the present invention being relatively simple and inexpensive to operate and install on existing equipment as well as inexpensive to incorporate into new equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
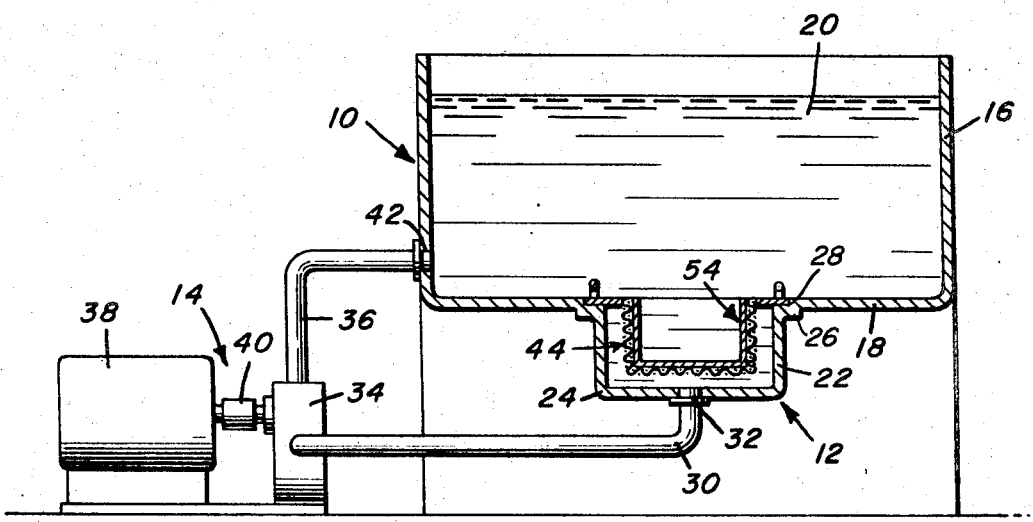
FIGURE 1 is a sectional view of a deep fat fryer illustrating the filter and strainer assembly incorporated therein together with the association of the pump therewith.
Figure 2:
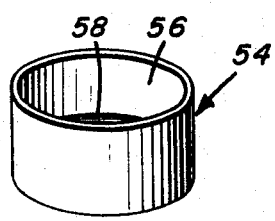
FIGURE 2 is a perspective view of the filtering element.

Referring now specifically to the drawings, the numeral 10 generally designates the deep fat fryer having the filtering and straining assembly 12 incorporated therein and associated with a pump and motor assembly 14 for circulating the cooking oil or fat.

As schematically illustrated, the deep fat fryer 10 includes a receptacle or pan 16 of conventional construction which may be heated in any number of ways conventionally employed such as by electric resistance heating elements, gas burners or the like. The specific details of the deep fat fryer are not illustrated inasmuch as they form no particular part of the invention except that the bottom 18 thereof is generally horizontally disposed and a quantity of cooking oil or fat 20 is provided within the deep fat fryer 10.

The bottom 18 of the deep fat fryer is provided with a well 22 which for purposes of illustration has been illustrated as being cylindrical in configuration with the well having a bottom 24 integral therewith. The upper edge of the cylindrical well 22 is joined with the bottom 18 of the fryer 10 at 26 and this connection may be in the form of a welding operation, soldering operation or the bottom and well may be constructed of one piece construction. The juncture between the bottom 18 and the well 22 is provided with a peripheral recess or seat 28 therein which faces upwardly and the bottom 24 of the well 22 is provided with a pipe or conduit 30 connected thereto in any suitable manner at 32.

The conduit or pipe 30 extends laterally of the well 22 and is communicated with the inlet side of a pump 34 which has a discharge line 36 communicated with the opposite side thereof. The pump 34 is driven by a suitable motor such as an electric motor 38 connected to the pump by a suitable coupling 40 or the like. The particular details of the pump and motor unit are not illustrated inasmuch as various types of pumps and motors may be employed with the pump 34 being preferably a gear type pump to provide for circulation of the cooking oil or fat 20 from the well 22, through the pump 34, back through the outlet pipe 36 through the fitting 42 into the interior of the deep fat fryer 10 adjacent the periphery of the bottom 18 as illustrated in FIG. 1 so that there will be a continuous circulation of the cooking oil or fat and a stirring or agitation of the cooking oil or fat will be obtained by operation of the pump 34.

Figure 3:
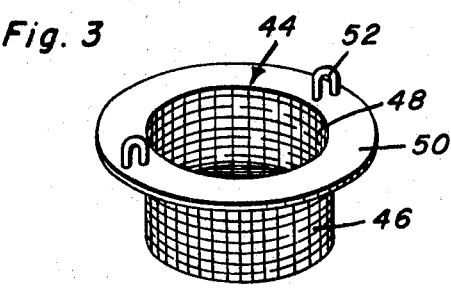
FIGURE 3 is a perspective view of the strainer basket.

Positioned within the well 22 is a wire basket type strainer illustrated in FIG. 3 and generally designated by the numeral 44 and which includes a cylindrical peripheral wall 46 of wire mesh material together with a circular bottom wall 48 of wire mesh material. At the upper end of the cylindrical wall 46, there is provided a flange 50 which is received on the seat or recess 28 so that the top surface of the flange 50 generally is flush with the top surface of the bottom 18 of the deep fat fryer so that any material or particles dropping onto the top surface of the bottom 18 of the deep fat fryer 10 may easily progress along the surface of the bottom of the deep fat fryer and over the top surface of the flange 50. The flange 50 is provided with a pair of loop-type handles 52 in the form of fixed eyes or the like which project above the surface of the flange 50 to enable suitable implements such as hooks to be employed to lift the strainer basket 44 upwardly out of the well 22 at any time desired to enable the interior of the strainer to be cleaned.

Disposed within the strainer 44 is a filter generally designated by the numeral 54 which includes a cylindrical wall 56 and a bottom wall 58 generally conforming in shape and configuration to the strainer basket 44. The filter 54 is constructed of fabric or filter paper material and once it is placed within the strainer basket, it will be retained in this position by the movement of the liquid cooking oil or fat therethrough during operation of the pump 34.

The filter 54 may be omitted in some circumstances where the articles of food being cooked only discharge relatively large particles into the cooking oil whereas in other instances, where relatively fine particles are discharged into the cooking oil, the filter 54 will effectively remove all solid particles above a predetermined size from the cooking oil during circulation thereof.

It is also pointed out that the particular shape and configuration of the well, strainer basket and filter may be varied depending upon the shape, configuration and size of the deep fat fryer. For example, these components may be constructed of rectangular configuration, square configuration or any other desired shape and size. Additionally, the circulation of the cooking oil reduces the effective time for cooking articles of food which are usually placed in the cooking oil while frozen or in a cold condition. When this occurs, the cooking oil or fat immediately surrounding the article of food is, in effect, cooled by the article of food and insulates the article of food from the remaining hot cooking oil. In other words, the cold article of food produces an insulating layer of cooled cooking oil peripherally thereof which tends to slow the cooking process. This is especially true when using a coating of batter, bread crumbs or the like on the article of food inasmuch as the cooking oil penetrates the batter and to a certain extent the article of food itself and this cooled insulating layer of cooking oil thus is retained more or less in enclosing relation to the article of food being cooked. By circulating the cooking fat by employing the pump and motor assembly and by cleaning the cooking oil by employing the filter and strainer assembly, this cold spot or insulating layer of cooled cooking oil will be removed by the agitation of the cooking oil due to the circulation thereof thereby materially reducing the cooking time for the particular article of food being cooked and rendering the cooking operation more efficient for producing a higher quality cooked item. Also, removal of the solid particles materially reduces the tendency of the cooking oil to retain odors from one food product and transfer such odors to another food prduct thereby further enhancing the quality of the food products produced by employing this invention.

What is claimed as new is as follows:

1. In combination with a deep fat fryer including an open-topped container having a bottom wall for retraining a quantity of cooking fat therein, a circulating and cleaning assembly for the cooking fat comprising an open-topped well in the bottom wall, said well having a peripheral upper edge spaced inwardly from the periphery of said bottom wall, an open-topped strainer assembly disposed in the well and communicated with the interior of the container for receiving cooking fat therefrom, said strainer assembly including an upper edge engaged with the upper edge of the well, and pump means communicated with the well below the upper edge thereof and below the upper edge of the strainer assembly for removing cooking fat therefrom for causing the cooking fat to pass through the strainer assembly, said pump means including a discharge communicating with the container without impeding access to the interior thereof for returning the cleaned cooking fat to the container and agitating the cooking fat within the container.

2. The combination as defined in claim 1 wherein said strainer assembly includes a basket strainer having a peripheral screen wall and a screen bottom, a filter element disposed within the basket strainer, said filter element including a peripheral wall and a bottom wall being constructed of filtering material and conforming with the shape and configuration of the basket strainer and disposed interiorly thereof.

3. The combination as defined in claim 2 wherein said pump means includes a pump disposed exteriorly of the confines of the container and well and communicated therewith through a pipe, motor means for driving said pump, said discharge including a pipe extending from the pump back to the container above the bottom wall thereof for discharging the cooking fat laterally of the upper surface of the bottom wall for agitating and stirring the cooking fat.

4. The structure as defined in claim 1 wherein said strainer assembly is in the form of a strainer having an outwardly extending peripheral flange at the top edge thereof in removable supporting engagement with the well whereby cooking fat entering the well must pass through the strainer, and means connected to said strainer by which the strainer may be lifted and removed freely through the open-topped container without impediment for removal of sediment from the strainer without emptying the cooking fat from the container.

5. The structure as defined in claim 4 wherein said means connected to said strainer is connected with said flange, the juncture between the upper edge of the well and bottom wall including a peripheral recess receiving said flange whereby sediment particles may enter the open top of the strainer.

References Cited

UNITED STATES PATENTS

| | | | |
|---|---|---|---|
| 2,652,767 | 9/1953 | Childs | 99—408 |
| 2,712,826 | 7/1955 | Schleyer et al. | 134—111 XR |
| 3,100,747 | 8/1963 | Hall | 210—167 |
| 3,263,818 | 8/1966 | Gedrich | 210—167 XR |
| 3,279,605 | 10/1966 | Shepherd. | |

BILLY J. WILHITE, Primary Examiner

U.S. Cl. X.R.

210—167